United States Patent
Moore et al.

(10) Patent No.: US 8,652,434 B2
(45) Date of Patent: Feb. 18, 2014

(54) EXPANDED PERCARBONATE SALTS, METHODS OF PRODUCTION AND USES THEREOF

(75) Inventors: Ryan Giffin Moore, Lilburn, GA (US); Joseph Matthew Garmon, Marietta, GA (US); Bridget Nicole Lemley, Marietta, GA (US)

(73) Assignee: ChemLink Laboratories, LLC, Kennesaw, GA (US)

( * ) Notice: Subject to any disclaimer, the term of this patent is extended or adjusted under 35 U.S.C. 154(b) by 7 days.

(21) Appl. No.: 13/406,201

(22) Filed: Feb. 27, 2012

(65) Prior Publication Data

US 2012/0219513 A1 Aug. 30, 2012

Related U.S. Application Data

(60) Provisional application No. 61/447,371, filed on Feb. 28, 2011, provisional application No. 61/447,383, filed on Feb. 28, 2011.

(51) Int. Cl.
*C01B 15/10* (2006.01)
*C01B 15/00* (2006.01)
*C11D 3/395* (2006.01)

(52) U.S. Cl.
USPC ............. 423/415.2; 252/186.27; 252/186.32; 510/375; 510/367

(58) Field of Classification Search
None
See application file for complete search history.

(56) References Cited

U.S. PATENT DOCUMENTS 5,169,553 A * 12/1992 Durbut et al. ................. 510/221
2008/0207479 A1 * 8/2008 Chapple et al. ............... 510/441

* cited by examiner

*Primary Examiner* — Lezah Roberts
(74) *Attorney, Agent, or Firm* — McKenna Long & Aldridge LLP; Matthew T. Bailey; Frank J. Miskiel

(57) ABSTRACT

The present invention discloses a compound comprising an expanded percarbonate salt having less than about 24 wt. % hydrogen peroxide. Also disclosed in this invention is a composition including the above-mentioned compound and a liquid loaded thereon. Further, there is disclosed a method of manufacturing the above-described compound.

26 Claims, 1 Drawing Sheet

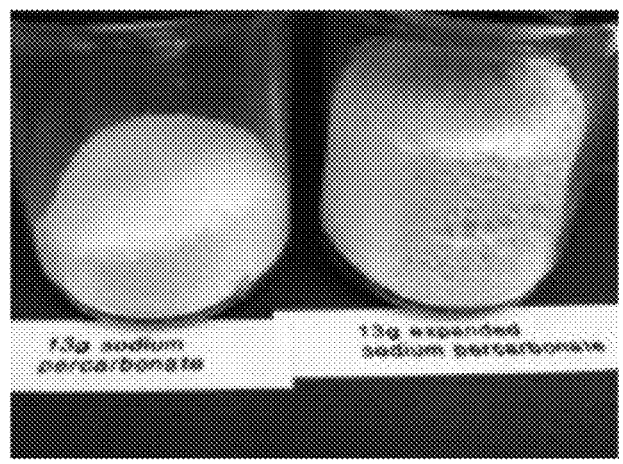

EXPANDED PERCARBONATE SALTS, METHODS OF PRODUCTION AND USES THEREOF

CROSS-REFERENCE TO RELATED APPLICATIONS

This application claims priority to U.S. Provisional Application Ser. Nos. 61/447,383 and 61/447,371, both filed Feb. 28, 2011, and incorporated by reference in their entireties.

FIELD OF THE INVENTION

The present invention generally relates to a compound including a novel sodium percarbonate salt. The invention also relates to compositions and cleaning systems including the novel sodium percarbonate salt. Further, the present invention relates to the method of manufacturing the novel sodium percarbonate salt.

BACKGROUND OF THE INVENTION

Carriers, also known as adsorbents or bases, are primarily useful for adsorbing liquid ingredients. The ability for a carrier to adsorb larger weights of liquid thereon at least depends upon its bulk density and porosity. Specifically, lower bulk density and higher porosity are considered desired characteristics of a good carrier.

Depending upon the commercial application of the carrier, it may be active or inactive, and/or water soluble or water insoluble. Traditional adsorbent carriers typically hold less than 10-20% by weight of a liquid component if water soluble, or 50-60% by weight of a liquid component if insoluble in water. Examples of known liquid carriers include alkali metal carbonates, or silicates such as zeolites.

For commercial purposes, most viable effervescent compositions do not contain water insoluble or slowly soluble carriers such as silicates. Carriers such as carbonates with more than 5% of any given liquid-based surfactant, e.g., amphoterics, anionics, cationics or non-ionics, also are impractical in effervescent compositions. Namely, insolubility or increased dissolution time requires additional, expensive disintegrants. Moreover, such effervescent compositions increase manufacturing time and therefore are not practical in a scaled-up production setting. Further, increased amounts of liquid(s) significantly reduce shelf life stability of the final effervescent composition.

One carrier known to adsorb large amounts of liquids without the above-mentioned drawbacks is a perborate salt. Namely, perborate salts expand upon controlled heating, following hydration. Perborate salts are capable of adsorbing up to 50% of its weight in liquids. The perborate salt carrier can preserve product stability and effervescent water solubility. However, the use of borate containing compounds has gradually decreased over the past decade in view of stricter environmental legislations and green-technology initiatives proposed in the United States and abroad.

A need therefore exists in the art for a non-toxic compound including carrier capable of adsorbing a large amount of liquid while maintaining product stability and water solubility.

A need also exists in the art for a composition including non-toxic carriers that load liquids therein.

A need also exists in the art for a cleaning system including non-toxic carriers capable of adsorbing a significant amount of liquid.

A further need exists for a method of manufacturing a non-toxic carrier with a low bulk density and high porosity capable of adsorbing significant amounts of liquid.

SUMMARY OF THE INVENTION

A novel, non-toxic carrier has been conceived by the inventors capable of adsorbing liquids ranging between about 50 to 80% of the carrier's weight. In particular, the novel carrier is a water soluble alkali percarbonate salt. The carrier may also exhibit effervescent characteristics. In a more preferred embodiment, the carrier is a relatively dry solid exhibiting powder flowability characteristics. In addition, the carrier preferably is anhydrous.

The novel, non-toxic carrier preferably is used in compositions for delivering liquids as active and necessary ingredients in amounts that otherwise would not be possible in view of conventional, non-eco friendly carriers such as perborate salts. Accordingly, the present invention provides viable sustainability solutions in view of current and proposed green-technology legislation in the United States and abroad.

One advantage of the present invention is to provide a novel, non-toxic compound including a novel, non-toxic percarbonate salt useful for adsorbing significant amounts of liquid.

Another advantage of the present invention is to provide a composition including a novel, non-toxic percarbonate salt loaded with liquid.

Another exemplary advantage of the present invention is a cleaning system including the above-mentioned composition.

A further exemplary advantage of the present invention is a method for making a compound including a novel, non-toxic percarbonate salt.

In an even further exemplary advantage of the present invention there is described a method for making a novel, composition including the above-mentioned non-toxic carrier.

In an exemplary embodiment, there is disclosed an effervescent compound comprising a percarbonate salt with less than about 24 wt. % hydrogen peroxide.

In another exemplary embodiment, there is disclosed a composition comprising a compound including a percarbonate salt with less than about 24 wt. % hydrogen peroxide. The composition further includes a liquid that is loaded onto the novel compound. In a more preferred embodiment, the novel compound adsorbs liquid in an amount up to about 80 wt. % thereof.

In a further exemplary embodiment, there is disclosed a cleaning system including a composition as disclosed above. The cleaning system also includes a predetermined amount of a dissolution medium, such as water, for dissolving the composition. The cleaning system can be used for denture cleaners, detergents, floor scrubbing cleaners, all-purpose cleaners, carpet cleaners, garbage disposal cleaners, glass cleaners, household appliance cleaners, industrial appliance cleaners and oral cavity cleaners.

In a further exemplary embodiment, there is disclosed a method of manufacturing a compound. The method at least includes the steps of providing a commercially available percarbonate salt. Next, water in an amount of about 0 to 10% by weight of the percarbonate salt is added thereto forming a hydrated percarbonate salt. The hydrated percarbonate salt is heated at temperatures above 100° C. for a predetermined amount of time to produce an expanded sodium percarbonate salt, anhydrous.

It is to be understood that both the foregoing general description and the following detailed description are exemplary and explanatory and are intended to provide further explanation of the invention as claimed.

BRIEF DESCRIPTION OF THE DRAWINGS

The accompanying drawing, which is included to provide a further understanding of the invention and is incorporated in and constitutes a part of this specification, illustrates embodiments of the invention and together with the description serve to explain the principles of the invention.

In the Drawings:

FIG. 1 illustrates the novel compound including an expanded sodium percarbonate salt according to the present invention and a conventional, commercially available sodium percarbonate salt.

DETAILED DESCRIPTION OF THE INVENTION

The present invention describes a novel, water-soluble, carrier, e.g., base or adsorbent, capable of adsorbing significant amounts of liquid components used in final compositions for cleaning, personal care and ingestible applications. The carrier preferably comprises an expanded, e.g., modified, alkali percarbonate salt. In an exemplary embodiment, the expanded alkali percarbonate salt is sodium percarbonate salt, anhydrous (ESPC). The ESPC has lower residual peroxide levels, lower bulk density, greater porosity and greater surface area than commercially available sodium percarbonate.

The bulk density of commercially available sodium percarbonate is about 0.91 g/mL and a volume of about 1.10 mL. By contrast, ESPC has a significantly lower bulk density of about 0.70 g/mL and a volume of 1.43 mL. The novel ESPC according to the present invention also exhibits reduced levels of hydrogen peroxide. Specifically, the hydrogen peroxide level for commercially available sodium percarbonate is between about 24%-28% by weight. Meanwhile, the hydrogen peroxide level for ESPC is less than 24% by weight. In a more preferred embodiment, the hydrogen peroxide level for ESPC is about 5% by weight. In yet even a more preferred embodiment, the amount of hydrogen peroxide in ESPC is less than about 2.5% by weight. For purposes of this invention, the percarbonate nomenclature for the novel ESPC carrier includes hydrogen peroxide because while hydrogen peroxide is significantly reduced, it is not completely removed from the compound.

Moreover, ESPC adsorbs up to about 80% of its weight in liquid or solvent ingredients while maintaining free-flowing properties, i.e., powder flowability. Free-flowing characteristics enable proper and constant dosing and are therefore considered commercially attractive in final compositions. On the other hand, commercially available sodium percarbonate adsorbs only about 20% of its weight in solvents such as dipropylene glycol methyl ether as described in Table 1.

ESPC exhibits a slightly higher pH value than commercially available sodium percarbonate. According to the present invention, commercially available sodium percarbonate salts included FB 100 (thin grade) 400 (thick grade) obtained from Solvay Chemicals, Inc., and Provox S obtained from OCI Chemical Corporation. As shown below, Table 1 compares general characteristics of ESPC and commercially available sodium percarbonate.

TABLE 1

General Characteristics of Sodium Percarbonate and ESPC

| General Chemical Characteristics | Commercial Sodium Percarbonate | ESPC |
|---|---|---|
| Bulk Density g/mL | 0.91-0.93 | 0.62-0.67 |
| % $H_2O_2$ | 24.98-28.67 | 2.1-0.1 |
| Liquid Loading max as grams Dipropylene Glycol Butyl Ether/grams carrier | 0.2:1 | 0.8:1 |
| 1% aqueous pH | 10.49-10.66 | 10.90-11.03 |

In another exemplary embodiment, ESPC, also known as modified anhydrous sodium percarbonate, exhibits a different color and shape than commercially available sodium percarbonate. Namely, ESPC is cream, off-white and/or tan colored. In a further embodiment, ESPC may be similar in color to modified anhydrous sodium perborate (MASP). By contrast, commercially available sodium percarbonate is white.

The ESPC carrier is irregularly shaped. In one embodiment, the ESPC carrier is shaped similar to puffed rice as illustrated in FIG. 1. In another embodiment, the ESPC carrier is shaped similar to grits. In FIG. 1, thirteen (13) grams of both ESPC and commercially available sodium percarbonate salt are provided in two separate glass jars. As illustrated in FIG. 1, ESPC is about twice the volume of commercially available sodium percarbonate salt. Further as shown in FIG. 1, ESPC is significantly more porous than commercially available sodium percarbonate.

In another, exemplary embodiment, the ESPC exhibits effervescent characteristics. This may be attributed to water vapor that re-condenses on the percarbonate salt particles achieved by covering the top of the reaction vessel. Accordingly, effervescence is created by the liberation of oxygen particles resulting in a greater number of pores. By so doing, an effervescent expanded sodium percarbonate salt, anhydrous is formed.

In another, exemplary embodiment, there is described a compound comprising the above-mentioned novel, water-soluble ESPC carrier. The compound may just include at least one of an acid, sodium bicarbonate, sodium carbonate, potassium bicarbonate, and sodium carbonate in combination with the ESPC liquid carrier. Inclusion of the acid and/or carbonates/bicarbonates is understood by the inventors to increase dissolution rates and/or pH levels.

In yet another, exemplary embodiment, there is described a final composition inclusive of a compound as described above, intended for use in tablets, granules and powder formulations. In another embodiment, the final composition may be an effervescent. Other ingredients also may be added to the "liquid-loaded" ESPC in the final composition. Desirable characteristics of these additional ingredients include, but are not limited to being compressible, free-flowable, concentrated, and non-sticky.

In an exemplary embodiment, these liquid ingredients may be mixed or dissolved in a solvent or mixture of solvents and, if necessary, distilled to remove any water or low-boiling point alcohol before loading onto the ESPC. Solvents may be volatile and/or non-volatile and include alcohols, ethers, glycerin, glycols, polyglycols, glycol ethers, esters, terpenes or combinations thereof. In an exemplary embodiment, the solvent comprises dipropylene glycol methyl ether.

The composition may further include any one, all or any combination of the following ingredients: surfactants, bleaching compositions, colorants, optical brighteners, anti-redeposition agents, detergents, chelating compounds, builders, softeners, binders, lubricants, corrosion inhibitors, sweeteners, vitamins, biologically active compounds, disinfectants, pesticides, fragrances and fertilizers.

In an exemplary embodiment, surfactants that may be added to the compound include, but are not limited to, synthetic anionic surfactants, which are generally water-soluble alkali metal salts of organic sulfates and sulfonates; non-ionic surfactants, which are generally the reaction products of alkylene oxide with alkyl phenol, or primary or secondary alcohols, or are amine oxides, phosphine oxides or dialkyl sulphoxides; amphoteric; or zwitterionic surfactants and/or soaps.

In another, exemplary embodiment, examples of the bleaching composition that may be used include, but are not limited to, chlorinated isocyanurates, perborate hydrates, persulfates or percarbonates. Examples of anti-redeposition agents include, but are not limited to, acrylates and cellulose derivatives.

In yet another, exemplary embodiment, the binder used in the composition of the present invention may include, for example, but are not limited to any one, all, or any combination of the following: starch and starch derivatives, cellulose and cellulose derivatives, carbohydrate gums, sugars, resins, proteins and inorganic salts. Examples of lubricants that may be used in the composition of the present invention include, but are not limited to any one, all, or any combination chosen from the following: sodium benzoate, sodium stearate, magnesium stearate, aluminum stearate, stearic acid, mineral oil and polyethylene glycol.

In yet even another exemplary embodiment, a composition may include up to about 45% by weight of liquids, e.g., solvents, if the compound includes only ESPC. Alternatively, a composition may include up to about 35% by weight of liquids if the compound includes ESPC in combination with alkali carbonates or bicarbonates and/or acids.

The composition generally is in powder form. Further processing of the powder can produce a tablet. The term "tablet" means both compressed tablets and compressed granular forms of final products. "Granular" means uniform-sized compressed mixtures. These tablets will be shelf stable and have good physical properties meaning the tablets will be hard; non-friable; of minimum size, both in weight and dimension for the application; be environmentally friendly; and have increased dissolution rates over tablets not made with the "liquid loaded" ESPC of the present invention. In a further, exemplary embodiment, a tablet form of the final composition may have slightly lower liquid or solvent loading capacities than powder forms of the final composition.

Several examples of compositions exist that either are enhanced by using the ESPC, or alternatively, are made in a non-environmentally friendly way such as with sodium perborate salts. Examples of these compositions include, but are not limited to, an adsorbent, an auto-dish detergent, an auto-dish rinse, an automobile detergent, an automobile wax, an automobile detail product, a bath foaming product, a bath oil, a bath salt, a beverage flavoring, a beverage enhancement, a bubble bath, a color dispersant, a deodorizer, a carpet cleaner, a corrosion inhibitor, a denture cleaner, a disinfectant, a dry lubricant, a dry solvent, a fertilizer, a floor cleaner, a fragrance dispenser, a fungicide, a furniture polish, a garbage disposal cleaner, a hard surface cleaner, a herbicide, a household appliance cleaner, an industrial appliance cleaner an insecticide, a laundry detergent, a laundry fabric softener, an oral care product, a pharmaceutical preparation, a preservative, a rust inhibitor, a sanitizer, a shampoo, a soap, and a wrinkle release agent.

In a further exemplary embodiment of the present invention, there is described a cleaning system. In yet a further exemplary embodiment, the cleaning system may include an effervescent. The cleaning stem includes the above-mentioned composition and a dissolution medium in a preferred combination. In one embodiment, water is the dissolution medium. In another embodiment, the dissolution medium is a low molecular weight solvent such as methanol, ethanol or isopropanol. As shown below, Table 2 provides examples of compositions including water-soluble liquid carriers and an approximate dilution volume of water desired for different applications.

TABLE 2

| Product | Approximate Composition Weight (G) | Approximate Dilution Volume |
|---|---|---|
| Laundry Detergent | 30-120 | 12 gallons |
| Carpet Cleaner | 10-40 | 1 gallon |
| All-Purpose Cleaner | 5-15 | 1 liter |
| Glass Cleaner | 1-8 | 1 liter |
| Oral Care | 0.5-3 | 5 mL |

The data in Table 2 is exemplary of what compositions might weigh for purposes of effective dissolution. Other weights and dilutions would be obvious to one skilled in the art based on the disclosure of the embodiments herein. For example lower dosages in the same volume would have decreased efficacy. Conversely, higher dosages in the same volume would have increased efficacy. Further, the preferred embodiment of the laundry detergent would be two 40 gram tablets per wash load. This embodiment using the technology described in the present invention would deliver 28 grams of liquid ingredients that would not otherwise be possible in an environmentally friendly formulation.

Listed herein are exemplary compositions using the ESPC. A floor scrubbing tablet may be made using ESPC which can include up to 20% of a solvent surfactant combination. Further the floor scrubber formulation may include up to 20% of a surfactant by weight of the cleaner. Fragrances may be included up to 3% by weight of the composition. Further the floor scrubber may include a total of up to 33% liquid ingredients that is five to ten times the amount possible by conventional tablet formulas. Further, the floor scrubber tablet made from ESPC will have a dissolution time of five to ten minutes at 40° C. when used as a cleaning concentrate.

Another example of a cleaner that can be produced using ESPC is a glass cleaner. They may include up to 30% of a solvent by weight of the composition that is not previously possible with water-soluble environmentally friendly chemistries. The composition can also include up to 3% by weight of a surfactant. This glass cleaner formula can contain up to a total of 33% by weight of liquid ingredients. Further, the glass cleaner tablet made from ESPC will have a dissolution time of five to ten minutes at 40° C. when used as a cleaning concentrate.

Another example of a possible product that can be made with the ESPC is a laundry detergent. This laundry detergent of the present invention can include liquid surfactant(s) in an amount up to 25% by weight of the composition. Further, this laundry detergent can include up to 5% of a liquid fragrance that is two to five times the amount possible by traditional tablet formulas. This laundry detergent formulation should have complete dissolution by the end of the wash cycle when run at 20° C. or higher.

Another example that can be made with the ESPC is a product intended for use in the oral cavity, or for ingestion. This orally utilized or ingested product could include up to 5% by weight of a liquid flavor ingredient. Further, this composition could include up to 25% of other liquid ingredients that would be considered active, medically beneficial or a pharmaceutical. This orally utilized or ingested product can contain up to a total of 33% by weight of liquid ingredients. Further, this orally utilized or ingested product would have complete dissolution in the oral cavity or the gut.

In a further exemplary embodiment, there is described a unique manufacturing process designed to solve commercial and governmental concerns regarding toxic carriers or adsorbents. Specifically, ESPC is produced from a commercially available source of sodium percarbonate such as FB 100 or FB 400 obtained from Solvay Chemicals, Inc., or Provox S obtained from OCI Chemical Corporation. According to the novel technique, the sodium percarbonate is hydrated with water in a desired amount. Then, the sodium percarbonate is heated at an elevated temperature. The elevated temperature evaporates a significant portion of hydrogen peroxide causing a reduction in weight thereof, and resulting in the expansion of the sodium percarbonate granule. By so doing, the expanded sodium percarbonate is more robust, i.e., puffy, than just dehydrating sodium carbonate.

In a more preferred embodiment, ESPC is produced by adding water to the commercially available sodium percarbonate material in a vessel, at a level between 0% and 10% by weight. Next this artificially hydrated sodium percarbonate is heated at sufficiently high temperatures for a desired amount of time to show weight loss between 20-30% of the original sodium percarbonate. For example, the operating temperature should be above 100° C. for at least 2 minutes and no more than 3 hours. One skilled in the art can recognize that extremely high temperature, such as 1000° C., and extraordinary long heating times, i.e., more than 5 hours, would cause decomposition of the materials. In addition, the processing vessel typically includes cover, such as a metal grate or hood, for trapping steam inside the vessel for promoting the reaction.

In an exemplary embodiment, water in an amount between about 0-4% by weight of the sodium percarbonate is added to the commercially available sodium percarbonate. The operating temperature is ideally between 135° C. and 180° C. for 10 to 30 minutes. The resulting ESPC exhibits a lower bulk density and higher porosity for liquid loading, than commercially available sodium percarbonate. By utilizing the technology described above, an increased amount liquid active ingredients can be loaded into a tablet or powder formula that would not otherwise be possible with traditional loading chemistries.

Results and Discussion

The following samples were conducted in order to determine optimal weight percentages and weights of reactants for producing an expanded sodium percarbonate with optimal loading capacity. The inventors selected commercially available sodium percarbonate salts ($2Na_2CO_3 \cdot 3H_2O_2$). Specifically, the sodium percarbonate salts used in these samples are FB 100 and FB 400 obtained from Solvay Chemicals, Inc., and Provox S obtained from OCI Chemical Corporation. The molecular weights of all compounds used during experimentation are described in Table 3 below.

TABLE 3

| Compound | Molecular Weight (MW) |
|---|---|
| Sodium Percarbonate Salt | 314 |
| Deionized Water | 18 |
| Potassium Bicarbonate | 100 |
| Potassium Carbonate | 138 |
| Sodium Bicarbonate | 84 |
| Sodium Carbonate | 106 |

Expanding Sodium Percarbonate Salt (Controlled Sample)

The inventors prepared expanded sodium percarbonate using four (4) different combinations in Samples A, B, C, and D. Density of the final produced product were observed for each sample. Each of these samples was conducted in a heating oven at about 300° F. for about 15 minutes. According to the samples, a monohydrate is equal to about 8 wt. % water of the compound. Samples A and B were prepared with no water. That is only FB 100 and Provox S were used for samples A and B, respectively. Samples C and D were prepared using each of FB 100 and Provox S, respectively, with a tri-hydrate.

TABLE 4

| Sample | Components | Weight (G) |
|---|---|---|
| A | Sodium Percarbonate (FB 400) | 5.22 |
| B | Sodium Percarbonate (Provox S) | 10.60 |
| C | Sodium Percarbonate (FB 400) | 8.00 |
|   | Tri-Hydrate of Deionized Water | 2.80 |
| D | Sodium Percarbonate (Provox S) | 16.00 grams |
|   | Tri Hydrate of Deionized Water | 4.00 grams |

Sample A exhibited no change after 15 minutes of heating at 300° F. Sample B became cream colored, i.e., similar to MASP, but the density of the product remained the same. Sample C exhibited no change except that hydrated chunks became very hard after processing. Sample D exhibited puffing.

From initial observations, the percentage of water and mass of reactants tends to promote favorable puffing conditions. Both Samples C and D included the same weight percentage of water. Sample C, however, included half the weight of reactants of exhibit D. In addition, Sample C used FB 400, whereas Sample D used Provox S.

Next, each of Samples E, F, G, H and I were conducted using at least the reactants of sodium percarbonate salt (Provox S) and water. Table 5 lists the compounds and amounts for each of Samples E, F, G, H and I and their results after hydration.

TABLE 5

| Sample | Compounds | Amounts (G) | Hydrated | Anhydrous (Natural Form) |
|---|---|---|---|---|
| E | Sodium Percarbonate Salt (Provox S) | 16.00 | Puffs, But Densifies the Resulting Powder | Slight Change |
|   | Water | 4.00 | | |
| F | Sodium Percarbonate Salt (Provox S) | 16.00 | No change | No Change |
|   | Water | 4.00 | | |
|   | Sodium Bicarbonate | 8.00 | | |

TABLE 5-continued

| Sample | Compounds | Amounts (G) | Hydrated | Anhydrous (Natural Form) |
|---|---|---|---|---|
| G | Sodium Percarbonate Salt (Provox S), | 16.30 | No change | No Change |
|  | Water | 4.00 |  |  |
|  | Sodium Carbonate | 7.80 |  |  |
| H | Sodium Percarbonate Salt (Provox S) | 16.00 | Slightly puffs | No Change |
|  | Water | 4.00 |  |  |
|  | Potassium Bicarbonate | 10.00 |  |  |
| I | Sodium Percarbonate Salt (Provox S) | 16.30 | Puffs | No Change |
|  | Water | 4.00 |  |  |
|  | Potassium Carbonate | 9.70 |  |  |

According to the results in Table 5, Samples E, H and I exhibited at least some degree of puffing, whereas Samples F and G including sodium bicarbonate and sodium carbonate, respectively exhibited no puffing, i.e., robustness. Sample I including potassium carbonate exhibited more favorable puffing than Sample H including potassium bicarbonate.

Hydration

Further tests were conducted by varying the level of hydration in order to manipulate puffing. By so doing, the amount of liquid loading of the carrier level also is directly affected. The goal is to produce a more porous carrier with a higher loading capacity. In the following samples, the amount of water, in terms of moles, was manipulated while maintaining a total weight of about 20.0 grams. One mole of water, i.e., a monohydrate, is equal to about 8 wt % of the total compound. In each of the following samples, the reactants were pre-mixed with a blender. Then, the reactants were transferred into a heating vessel and heated 300° F. for about 5 to 20 minutes. The top of the heating vessel was covered with a metal grate for promoting the reaction and also for trapping popping pieces inside the heating vessel.

TABLE 6

| Sample | Molecules Of Water | Weight Of Water (G)/ 20 Grams Total Effervescent Compound | Color | Loading Capacity Of ESPC |
|---|---|---|---|---|
| J | Hemi-hydrate, e.g., 0.5 moles | 0.80 | White powder turned cream/off-white/tan | 60% |
| K | Monohydrate, e.g., 1.0 moles | 1.6 | White powder turned cream/off-white/tan | 66% |
| L | Di-hydrate, e.g., 2.0 moles | 2.95 | Turned Cream but Puffed | 100%, but wet |
| M | Tri-hydrate, e.g., 3.0 moles | 4.1 | Maintained white color | 75% |
| N | No water | 0 | Turned cream/off-white/tan | 100%, but wet |

According to the above-mentioned results, sample M using the tri-hydrate resulted in a carrier with a loading capacity of 75%. While the resulting carrier of sample M puffed, it did not change color. That is, it remained white. In addition, the carrier got very hard. On the other hand, Sample L using monohydrate resulted in a carrier with a loading capacity of 66%. The resulting carrier appeared cream/tan in color.

Thickness of Layer

Further, the inventors increased the weight of the reactants in each of Samples O, P, Q and R. By so doing, the layers were thick. The inventors assessed whether a thicker layer would increased loading capacity of the resulting carrier. The components for Samples O, P, Q and R are provided in Table 7 below. As discussed above, a monohydrate is equal to 8 wt % of the carrier.

TABLE 7

| Sample | Compounds | Amounts (G) | Loading |
|---|---|---|---|
| O | Sodium Percarbonate Salt (Provox S) | 41.00 | 80% |
|  | Hemi-hydrate of Water | 1.60 |  |
| P | Sodium Percarbonate Salt (Provox S) | 41.00 | 80% |
|  | Monohydrate of Water | 3.20 |  |
| Q | Sodium Percarbonate Salt (Provox S), | 41.00 | 20% |
|  | Hemi-hydrate of Water | 1.60 |  |
|  | Potassium Carbonate | 7.40 |  |
| R | Sodium Percarbonate Salt (Provox S) | 41.00 | 30% |
|  | Monohydrate of Water | 3.20 |  |
|  | Potassium Carbonate | 5.80 |  |

According to the results provided in Table 7 above, a hemi-hydrate of sodium percarbonate salt of sample O produced a carrier that exhibited a loading capacity of 80% when heated at 300° F. While the resulting carrier of Sample P also loads up to 80% if necessary, the preferred loading capacity is about 66%. Samples Q and R including potassium salts appear not to enhance the loading capacity of the expanded sodium percarbonate salt (ESPC) as well as Samples O and P.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A carrier, comprising an expanded percarbonate salt having a bulk density of 0.62 to 0.7 g/mL and a hydrogen peroxide content of about 0.1 wt. % but less than 24 wt. %.

2. The carrier of claim 1, wherein the expanded percarbonate salt comprises about 5 wt. % hydrogen peroxide.

3. The carrier of claim 1, wherein the expanded percarbonate salt comprises about 0.1 to 2.1 wt. % hydrogen peroxide.

4. The carrier of claim 1, wherein the expanded percarbonate salt holds up to about 80% of its weight in liquid.

5. The carrier of claim 4, wherein the expanded percarbonate salt comprises an anhydrous sodium percarbonate salt.

6. The carrier of claim 1, further comprising an acid, sodium carbonate, sodium bicarbonate, potassium carbonate, potassium bicarbonate or combinations thereof.

7. The carrier of claim 1 that is an effervescent.

8. A composition comprising: the carrier of claim 1, comprising an expanded percarbonate salt; and liquid loaded onto the expanded percarbonate salt.

9. The composition of claim 8, wherein the expanded percarbonate salt comprises about 5 wt. % hydrogen peroxide.

10. The composition of claim 8, wherein the expanded percarbonate salt comprises about 0.1 to 2.1 wt. % hydrogen peroxide.

11. The composition of claim 8, wherein the expanded percarbonate salt holds up to about 80% of its weight of the liquid.

12. The composition of claim 11, wherein the expanded percarbonate salt comprises an anhydrous sodium percarbonate salt.

13. The composition of claim 8, further comprising an acid, sodium bicarbonate, sodium carbonate, potassium bicarbonate, potassium carbonate or combinations thereof.

14. The composition of claim 11, wherein the liquid is present in an amount up to about 45 wt. % of the composition.

15. The composition of claim 13, wherein the liquid is present in an amount up to about 35 wt. % of the composition.

16. The composition of claim 8, wherein the liquid is selected from the group consisting of glycols, polyglycols, alcohols, glycol ethers, glycerin, esters, terpenes, anionic surfactants, non-ionic surfactants, amphoteric surfactants, zwitterionic surfactants, a fragrance and combinations thereof.

17. The composition of claim 16, wherein the glycol ether is dipropylene glycol methyl ether.

18. The composition of claim 8 that is an effervescent.

19. The composition of claim 8 that is a tablet or powder.

20. A cleaning system, comprising:
    the composition to of claim 19; and
    a dissolution medium for dissolving the composition.

21. A method of manufacturing the expanded percarbonate salt of claim 1, comprising:
    providing a percarbonate salt;
    adding water in amount of 0.01 to 4 wt. % of the percarbonate salt forming a hydrated percarbonate salt; and
    heating the percarbonate salt from about 135 to 180° C. for a time ranging from about 2 minutes to three hours.

22. The method of claim 21, wherein the time for heating is less than about thirty minutes.

23. A method of manufacturing a composition, comprising:
    providing the expanded percarbonate salt prepared according to the method of claim 21, and
    loading the expanded percarbonate salt with a liquid.

24. The method of claim 23, wherein the expanded percarbonate salt holds up to about 80% of its weight of the liquid.

25. The method of claim 24, wherein the expanded percarbonate salt comprises an anhydrous sodium percarbonate salt.

26. The method of claim 23, wherein the liquid is selected from the group consisting of glycols, polyglycols, alcohols, glycol ethers, glycerin, esters, terpenes, anionic surfactants, non-ionic surfactants, amphoteric surfactants, zwitterionic surfactants, a fragrance and combinations thereof.

* * * * *

UNITED STATES PATENT AND TRADEMARK OFFICE
CERTIFICATE OF CORRECTION

| | | |
|---|---|---|
| PATENT NO. | : 8,652,434 B2 | Page 1 of 1 |
| APPLICATION NO. | : 13/406201 | |
| DATED | : February 18, 2014 | |
| INVENTOR(S) | : Moore et al. | |

It is certified that error appears in the above-identified patent and that said Letters Patent is hereby corrected as shown below:

IN THE CLAIMS:

Column 11, lines 21 should read

Claim 20.     A cleaning system, comprising:

a composition of claim 19; and a dissolution medium for dissolving the composition.

Signed and Sealed this
Tenth Day of June, 2014

Michelle K. Lee
*Deputy Director of the United States Patent and Trademark Office*